United States Patent [19]

Shu

[11] Patent Number: 5,609,209

[45] Date of Patent: Mar. 11, 1997

[54] HIGH TEMPERATURE PROFILE GEL FOR CONTROL OF OIL RESERVOIR PERMEABILITY

[75] Inventor: Paul Shu, Cranbury, N.J.

[73] Assignee: Mobil Oil Corporation, Fairfax, Va.

[21] Appl. No.: 504,879

[22] Filed: Jul. 20, 1995

[51] Int. Cl.$^6$ ............................................. E21B 33/138
[52] U.S. Cl. ........................... 166/295; 166/300; 507/903; 523/130
[58] Field of Search ..................... 166/270, 288, 166/295, 300; 507/903; 523/130

[56] References Cited

U.S. PATENT DOCUMENTS

| | | | |
|---|---|---|---|
| 4,665,986 | 5/1987 | Sandiford | 166/288 |
| 4,665,987 | 5/1987 | Sandiford et al. | 166/295 X |
| 4,896,723 | 1/1990 | Hoskin et al. | 166/272 |
| 5,015,400 | 5/1991 | Shu | 166/270 X |
| 5,071,890 | 12/1991 | Shu et al. | 166/288 |
| 5,085,787 | 2/1992 | Pinschmidt, Jr. et al. | 507/903 X |
| 5,134,176 | 7/1992 | Shu | 523/130 |

*Primary Examiner*—George A. Suchfield
*Attorney, Agent, or Firm*—Malcolm D. Keen

[57] ABSTRACT

A profile control system utilizing an aqueous gelation solution with a controllable gelation delay mechanism for high temperature hydrocarbon producing reservoirs. The gel is produced from the cross-linking of a polyvinylalcohol-co-polyvinylamine copolymer with a dialdehyde or polyaldehyde or an acetal or bisulfite derivative of such aldehyde, catalyzed by acid derived from a latent acid, e.g., a water-soluble trialkylphosphate, as timed-release agent to neutralize the strong base, e.g., NaOH, added to retard gelation. When the pH is reduced to the optimal value, a strong gel forms. The delay time can be programmed by the molar ratio of strong base to latent acid and their total amounts.

24 Claims, No Drawings

HIGH TEMPERATURE PROFILE GEL FOR CONTROL OF OIL RESERVOIR PERMEABILITY

BACKGROUND OF THE INVENTION

1. Field of the Invention

This invention relates to the control of oil reservoir permeability utilizing a high temperature profile gel having a controllable delay mechanism.

2. Background Information Including Description of Related Art

When hydrocarbon producing wells are drilled, initial hydrocarbon production is usually attained by natural drive mechanisms, e.g., water drive, solution gas, or gas cap, which force the hydrocarbons into the producing wellbores. If a hydrocarbon reservoir lacks sufficient pore pressure as imparted by natural drive to allow natural pressure-driven production, artificial lift methods, e.g., pump or gas lift are used to produce the hydrocarbon.

As a large part of the reservoir energy may be spent during the initial or "primary" production, it is frequently necessary to use secondary hydrocarbon production methods to produce the large quantities of hydrocarbons remaining in the reservoir. Waterflooding is a widespread technique for recovering additional hydrocarbon and usually involves an entire oil or gas field. Water is injected through certain injection wells which are selected based on a desired flood pattern and on lithology and geological disposition of the pay interval. Displaced oil is then forced into producing wells in the field.

Advancements in secondary hydrocarbon producing technology has led to several improvements in water-flood techniques. For example, the viscosity of the injected water can be increased using certain polymer vicosifiers, such as polyacrylamides, polysaccharides and biopolymers, to improve the "sweep efficiency" of the injected fluid. This results in greater displacement of hydrocarbons from the reservoir.

Ability to displace oil form all the producing intervals in a hydrocarbon reservoir is limited by the lithological stratification in the reservoir. That is, there are variations in permeability which allow the higher permeability zones to be swept with injected fluid first and leave a major part of the hydrocarbon saturation in the lower permeability levels in place. Thus, one of the problems encountered in the water flooding of permeability-stratified reservoirs is the formation of water channels through the most permeable routes between the injector and producer wells that greatly reduces the sweep efficiency of the driving fluid. This situation is also common in other fluid and gas-driven oil recovery processes, such as $CO_2$ and steam flood. In dealing with the problem, the permeability of such channels must be reduced to improve the sweep efficiency. This approach is commonly called permeability profile control. One of the methods practiced in the field is to inject gelatin solutions into these high permeability channels to form a solid gel plug after the solution is set in these channels.

Gel placement and its stability are two important considerations for a successful profile control process, especially in the treatment of high temperature reservoirs due to the harsh environment and fast gelation rate. However, there is need for more hydrothermally stable polymers for a long, reliable service and the employment of better gelation chemistry so that gel will not set prematurely during injection.

U.S. Pat. No. 4,896,723, issued Jan. 30, 1990 to Hoskin et al., discloses a cross-linked polymer obtained by cross-linking polyvinyl alcohol with a mixture of a phenolic component and an aldehyde or a mixture of a naptholic component and an aldehyde, utilized as a permeability control agent in oil recovery operations.

U.S. Pat. No. 5,015,400, issued May 14, 1991 to Shu, teaches the use of amino resins such as melamine-formaldehyde resin to co-gel and crosslink with polymers having amine, amide, hydroxyl or thiol functionalities, e.g., polyvinylalcohol, or acrylamide-modified polyvinylalcohol, in the formation of gels useful as permeability control agents for high temperature reservoirs during a water-flooding operation in an oil recovery process.

U.S. Pat. No. 5,134,176, issued Jul. 28, 1992 to Shu, discloses gel-forming compositions capable of plugging highly permeable zones in a subterranean formation and comprising water, a viscosifying amount of a water-dispersible polyvinylamine copolymer, and a cross-linking agent which is a mixture of an aldehyde and a phenolic component in an amount effective to cause gelation of the aqueous solution of the copolymer.

SUMMARY OF THE INVENTION

In accordance with this invention, a novel profile control gel system is provided utilizing an aqueous gelation solution with a controllable gelation delay mechanism for high temperature hydrocarbon producing reservoirs. The gel is produced from the cross-linking of a polyvinylalcohol-co-vinylamine copolymer with a water soluble dialdehyde or polyaldehyde, or an acetal or bisulfite derivative of such aldehyde, catalyzed by acid derived from a latent acid, e.g., a water-soluble trialkyl phosphate. The gelation delay mechanism employs the latent acid as a timed-release agent to neutralize the strong base, e.g., NaOH, added to retard gelation. When the pH is reduced to the optimal value, a strong gel forms. The delay time can be programmed by the molar ratio of base to latent acid and their total amounts.

DETAILED DESCRIPTION OF THE INVENTION

The polyvinylalcohol-co-vinylamine copolymers (PVOH-VAM) contemplated under this invention are copolymers of vinyl alcohol and vinylamine, e.g., in hydrochloride form, which may be produced, for example, by substantially complete hydrolysis of a copolymer of vinyl acetate and N-vinylformamide prepared by means of conventional free radical polymerization techniques. The PVOH-VAM, for example, in its hydrochloride form may then be prepared in accordance with the following equation.

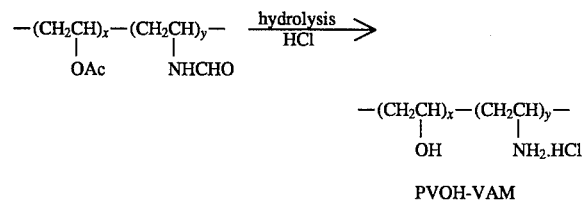

The PVOH-VAM utilized in this invention may contain, for example, about 1 to 30 mol %, preferably about 5 to 15 mol % of polymerized vinylamine units based on the total of polymerized vinylalcohol and vinylamine units in the polymer while the weight average molecular weight (Mw) of the PVOH-VAM may be in the range, for example, of about 10,000 to 1,000,000, preferably about 20,000 to 500,000. Preferably, a weight average molecular weight of over 50,000 and a relatively high vinylamine content up to 30 mol % are utilized for stronger gels and brine tolerance. The vinylamine units can be in the form of a salt, e.g., the hydrochloride, or in free base form. The PVOH-VAM concentration in the aqueous gelation solutions may be in the range, for example, of about 1 to 30 wt. %, preferably about 3 to 15 wt. %, with the specific concentration utilized depending on the molecular weight of the polymer and gel strength requirements.

As stated, a water soluble dialdehyde or polyaldehyde or a water soluble acetal or bisulfite derivative thereof may be used as the cross-linking agent for the PVOH-VAM in the aqueous gelation solutions of the present invention. The free dialdehyde or polyaldehyde added as such to the gelation solution or formed by hydrolysis of the acetal or bisulfite derivative of the dialdehyde or polyaldehyde, is believed to be the active cross-linking species. Water-soluble dialdehydes and their derivatives which can be used are, for example, glyoxal, malonaldehyde and glutaraldehyde and their acetals and bisulfites such as malonaldehydebis(diethylacetal) (MABDEA) and malonaldehydebis(dimethylacetal) (MABDMA). Polyaldehydes which can be used are, for example, paraformaldehyde and trioxane. Preferred cross-linking agents are the acetals of the foregoing aldehydes and polyaldehydes in which the alkyl radicals of the acetal groups are methyl or ethyl. Most preferred are MABDEA and MABDMA.

The PVOH-VAM in aqueous solution is cross-linked by the foregoing aldehydes or derivatives to form gels at elevated temperatures when the pH of the solution is in the acid range. Thus, an amount of cross-linking agent is utilized in the gelation solution so that a sufficiently strong gel forms after a reasonable delay period caused by the lowering of the pH of the solution from an initial relatively high level in the basic range to a lower level in the acid range at which gelling occurs. Such lowering of the pH is effected by the addition to the solution, just prior to its injection into the reservoir formation, of a latent acid, e.g., a trialkyl phosphate, which slowly liberates an active acid, e.g., phosphoric acids, causing the solution to gel after it fills the pores and interstices of the higher permeability zones of the formation. In many instances, e.g., when the cross-linking agent is MABDEA or MABDMA, the amount of cross-linking agent utilized in the gelation solution is in the range of 0.1 to 5 wt. %, preferably about 0.5 to 1.5 wt. %.

The relatively high initial pH of the solution of PVOH-VAM and aldehyde or derivative cross-linking agent is necessary to prevent the gelling of the solution which occurs unless the pH is kept above about 7.5. Such high initial pH is achieved by adding a strong base to the solution, e.g. NaOH, the tetrasodium salt of ethylenediaminetetraacetic acid ($Na_4EDTA$), KOH, $K_4EDTA$, $Na_2CO_3$, $K_2CO_3$ or mixtures of such bases. The preferred base is NaOH or a mixture of NaOH and $Na_4EDTA$. The initial pH of the solution before the addition of the latent acid will generally be in the range of about 7.1 to 12, preferably about 8 to 11. The pH should be high enough so that after the addition of latent acid, sufficient time is provided so that the solution can be injected into the reservoir formation and occupy the pores and interstices of the higher permeability zones of the formation before gelation occurs.

The latent acid is added to the solution just prior to the injection of the solution into the reservoir formation and has the property of slowly decomposing at the initial basic pH of the solution and at lower pH's to form an acid which neutralizes the strong base in the solution and reduces the pH to a value at which cross-linking of the PVOH-VAM occurs causing gelation of the solution at the elevated temperature of the formation. Such temperature is generally in the range of about 60° to 120° C., and often about 80° to 110° C. Acids which can be used for this purpose are the water-soluble trialkyl phosphates, e.g., triethylphosphate (TEP), trimethylphosphate, tri-n-butylphosphate and triisobutylphosphate, preferably TEP. Water-soluble mixed trialkylphosphates may also be used. The amount of latent acid added should be sufficient to provide the necessary delay in the gelation of the solution such that such gelation occurs after the solution enters the pores and interstices of the high permeability zones of the formation. Such delay may be in the range, for example, of about 1 to 72 hours, preferably about 5 to 24 hours. In many instances, the molar ratio of the strong base to latent acid (assuming one gram ion of hydroxyl ion liberated per gram mole of strong base, e.g., NaOH, and one gram ion of hydrogen ion per mole of latent acid, e.g., TEP, are liberated within the pH range occurring in the gelation delay period) is about 0.1 to 3, preferably about 0.2 to 2. However, in the case of $Na_4EDTA$ which is capable of liberating up to four hydroxyl ions per molecule of $Na_4EDTA$, depending on the pH level, the molar ratio of $Na_4EDTA$, when it is the only strong base utilized, to latent acid is, for example about 0.1 to 4, preferably about 0.2 to 3. When NaOH and $Na_4EDTA$ are used together, the molar ratio of NaOH+$Na_4EDTA$ to latent acid is, for example about 0.1 to 4, preferably about 0.2 to 3, and the molar ratio of $Na_4EDTA$ to NaOH is, for example, about 0.1 to 10, preferably about 0.5 to 5.

In a specific preferred system based on PVOH-VAM together with NaOH as the only strong base and TEP as the latent acid at a molar ratio of NaOH to TEP of about 0.1 to 3, the PVOH-VAM in the gelation solution should contain about 6 mol % of vinylamine (PVOH-VAM-6) or 12 mol % vinylamine (PVOH-VAM-12) to obtain a reasonably long gelation delay of about 5 to 24 hours at gelation temperatures of about 60° to 110° C.

In another specific preferred system based on a mixture of $Na_4EDTA$+NaOH as the strong base, with TEP as the latent acid (molar ratio of NaOH+$Na_4EDTA$ to TEP about 0.1 to 4, molar ratio of $Na_4EDTA$ to NaOH 0.2 to 3) the vinylamine content of the PVOH-VAM in the gelation solution should be about 6 mol % (PVOH-VAM-6), or 12 mol % (PVOH-VAM-12) to obtain a gelation delay of about 1 to 72 hours at gelation temperatures of about 60° to 110° C.

EXAMPLES 1 and 2

These examples further illustrate the invention wherein the polymer is PVOH-VAM-6 or PVOH-VAM-12, the cross-linking agent is MABDEA and the strong base is NaOH.

Aqueous gelation solutions were prepared containing 5 wt. % of either a PVOH-VAM-6, having a weight average molecular weight (Mw) of 61,000 (Example 1), or a PVOH-VAM-12 having a Mw of 68,000 (Example 2), each polymer in the form of its hydrochloride, and each solution also containing 3 wt. % of sea salts and 0.7 wt. % of MABDEA and adjusted to a pH of 9 with NaOH. Then 0.5 wt. % of TEP was added and the progress of gelation at 90° C. was determined for each solution by measuring its pH and viscosity at various intervals, using a Rheometric Fluids Rheometer with oscillatory shear measurements. Experiments were performed with a parallel plate geometry at the rate of 10 rad/sec and 30% strain. Results are shown in Table I wherein for each solution and time interval is shown the viscosity of the solution in centipoises (cp.) to the left of the slash line and the pH of the solution to the right of the slash line.

TABLE I

Viscosity and pH Changes During the Delayed Gelation of PVOH-VAM

| Time, Hrs. | Viscosity, cp/pH | | | | | | | |
|---|---|---|---|---|---|---|---|---|
| | 0 | 1 | 3 | 4 | 5 | 6 | 7 | 24 |
| Ex. 1, PVOH-VAM-6 | 53/9 | 67/8.51 | 104/7.46 | 158/6.11 | 460/3.9 | Gel/2.98 | — | Gel/1.21 |
| Ex. 2, PVOH-VAM-12 | 47/8.98 | 51/8.71 | 59/8.25 | 72/7.95 | 80/7.7 | 172/6.95 | 170/6.98 | Gel/1.05 |

The PVOH-VAM-6 gelled with a 6 hour delay at a final pH of 2.98, whereas at a pH of 3, it gelled in ≈45 minutes in a separate experiment without the delaying mechanism. Similarly, PVOH-VAM-12 gelation was delayed 24 hours at a final pH of 1.05, whereas at a pH of 1, it gelled in ≈20 minutes in a separate experiment without the delaying mechanism. The shorter delay for PVOH-VAM-6 than that of PVOH-VAM-12 was due to the smaller amount of NaOH needed to adjust the initial pH to 9.

EXAMPLES 3 to 23

These examples illustrate the invention wherein the polymer is PVOH-VAM-6·HCl, the cross-linking agent is MAB-DMA and the strong base is a mixture of NaOH and $Na_4EDTA$.

The procedure of Example 1 was followed except that the cross-linking agent was 0.7 wt. % of MABDMA in place of MABDEA, the strong base was a mixture of varying amounts of $Na_4EDTA$ and NaOH in place of NaOH alone, varying amounts of TEP were used as the cross-linking agent as shown in Table II, and the progress of gelation was carried out at 110° C. rather than 90° C. Results are shown in Table II which lists for each example the molar concentrations (M or mols/L) of $Na_4EDTA$, NaOH and TEP, the initial pH after the addition of $Na_4EDTA$ and NaOH, and the gel time in hours.

TABLE II

Gelation Delay of PVOH-VAM-6.HCl Gels at 110° C.

| Example | $Na_4EDTA$ Conc., M | NaOH Conc., M | TEP Conc., M | Initial pH | Gel Time Hours |
|---|---|---|---|---|---|
| 3 | 0.03 | 0.01 | 0.06 | 8.82 | 2.75 |
| 4 | 0.03 | 0.02 | 0.06 | 9.27 | 5 |
| 5 | 0.03 | 0.03 | 0.06 | 9.65 | 6.75 |
| 6 | 0.03 | 0.04 | 0.06 | 10.0 | 11 |
| 7 | 0.04 | 0.03 | 0.06 | 9.7 | 10.5 |
| 8 | 0.03 | 0.01 | 0.09 | 8.84 | 2.5 |
| 9 | 0.03 | 0.02 | 0.09 | 9.25 | 4 |
| 10 | 0.03 | 0.03 | 0.09 | 9.64 | 6 |
| 11 | 0.03 | 0.04 | 0.09 | 9.98 | 7.5 |
| 12 | 0.04 | 0.03 | 0.09 | 9.68 | 6.5 |
| 13 | 0.03 | 0.01 | 0.12 | 8.89 | 2.5 |
| 14 | 0.03 | 0.02 | 0.12 | 9.26 | 3.5 |
| 15 | 0.03 | 0.03 | 0.12 | 9.67 | 5.5 |
| 16 | 0.03 | 0.04 | 0.12 | 9.49 | 6 |
| 17 | 0.04 | 0.03 | 0.12 | 9.69 | 5.5 |
| 18 | 0.02 | 0.03 | 0.04 | 9.51 | 6.75 |
| 19 | 0.03 | 0.03 | 0.04 | 9.61 | 8.5 |
| 20 | 0.04 | 0.03 | 0.04 | 9.67 | 14 |
| 21 | 0.02 | 0.03 | 0.05 | 9.51 | 6.5 |
| 22 | 0.03 | 0.03 | 0.05 | 9.62 | 7.75 |
| 23 | 0.04 | 0.03 | 0.05 | 9.68 | 12 |

Table II indicates a range of gel times of 2.5 to 14 hours obtained by varying the concentrations of each component with an initial pH of up to 10, and with the additional advantage, contributed by the $Na_4EDTA$, of the prevention of the precipitation of divalent cations.

EXAMPLES 24 to 31

These examples illustrate the effect of varying the concentration of $Na_4EDTA$ between 0.02 and 0.05M at the two TEP concentrations of 0.04 and 0.05M and at a constant NaOH concentration of 0.03M.

The procedure of Examples 3 to 23 was followed except that the concentrations of $Na_4EDTA$ and TEP were varied and the concentrations of NaOH kept constant as described in the preceding paragraph. Results are shown in Table III.

TABLE III

| Example | $Na_4EDTA$ Conc., M | TEP Conc., M. | Initial pH | Gel Time Hours |
|---|---|---|---|---|
| 24 | 0.02 | 0.04 | 9.42 | 6.5 |
| 25 | 0.03 | 0.04 | 9.58 | 8 |
| 26 | 0.04 | 0.04 | 9.65 | 9.75 |
| 27 | 0.05 | 0.04 | 9.68 | 13.25 |
| 28 | 0.02 | 0.05 | 9.54 | 6 |
| 29 | 0.03 | 0.05 | 9.6 | 7.5 |
| 30 | 0.04 | 0.05 | 9.64 | 10.5 |
| 31 | 0.05 | 0.05 | 9.72 | 13 |

For over one year at 110° C., the gels of these examples have shown exceptional stability without any sign of syneresis or deterioration of gel integrity.

I claim:

1. A method for reducing the permeability of the higher permeability zones of a hydrocarbon producing reservoir formation at an elevated temperature comprising adding a latent acid, which slowly liberates an active acid, to an aqueous gelation solution containing dissolved therein a water-soluble copolymer of vinylalcohol and vinyl amine (PVOH-VAM), a cross-linking agent selected from the group consisting of water-soluble dialdehydes and polyaldehydes and their acetal and bisulfite derivatives, and a strong base which causes the solution to have an initial basic pH at which gelling of the solution due to reaction between the PVOH-VAM and cross-linking agent does not occur, and injecting the solution, after the addition of said latent acid, into said reservoir formation such that said solution gels after filling the pores and interstices of said higher permeability zones, due to a lowering of the pH of the solution to an acid value at which a reaction between said PVOH-VAM and cross-linking agent occurs.

2. The method of claim 1 wherein said PVOH-VAM contains polymerized vinylamine units in the range of about 1 to 30 mol % based on the total of polymerized vinylalcohol and vinylamine units.

3. The method of claim 2 wherein said range of polymerized vinylamine units is about 5 to 15 mol %.

4. The method of claim 1 wherein said PVOH-VAM has a weight average molecular weight (Mw) of about 10,000 to 1,000,000.

5. The method of claim 4 wherein said range of Mw is about 20,000 to 500,000.

6. The method of claim 1 wherein the concentration of said PVOH-VAM in the solution is in the range of about 1 to 30 wt. % based on the weight of the solution.

7. The method of claim 6 wherein said range of concentration of PVOH-VAM is about 3 to 15 wt. %.

8. The method of claim 1 wherein the cross-linking agent is malonaldehydebis(diethylacetal) (MABDEA) or malonaldehydebis(dimethylacetal) (MABDMA).

9. The method of claim 8 wherein said cross-linking agent is MABDEA.

10. The method of claim 8 wherein said cross-linking agent is MABDMA.

11. The method of claim 1 wherein the concentration of said cross-linking agent in said gelation solution is in the range of about 0.1 to 5 wt. %, based on the weight of the solution.

12. The method of claim 11 wherein said range of concentration of cross-linking agent is about 0.5 to 1.5 wt. %.

13. The method of claim 1 wherein said strong base is NaOH.

14. The method of claim 13 wherein the molar ratio of NaOH to latent acid is in the range of about 0.1 to 3.

15. The method of claim 1 wherein said strong base is a mixture of $Na_4EDTA$ and NaOH.

16. The method of claim 15 wherein the molar ratio of NaOH+$Na_4EDTA$ to latent acid is in the range of about 0.1 to 4 and the molar ratio of $Na_4EDTA$ to NaOH is in the range of about 0.1 to 10.

17. The method of claim 1 wherein said strong base is present in an amount to cause the initial pH of said solution prior to addition of latent acid to be about 7.1 to 12.

18. The method of claim 17 wherein said range of initial pH is about 8 to 11.

19. The method of claim 1 wherein said latent acid is a water-soluble trialkyl phosphate.

20. The method of claim 19 wherein said trialkylphosphate is triethylphosphate (TEP).

21. The method of claim 1 wherein the elapsed time between the addition of said latent acid and the gelation of the solution is in the range of about 1 to 72 hours.

22. The method of claim 21 wherein said range of elapsed time is about 5 to 24 hours.

23. The method of claim 1 wherein the temperature of said reservoir formation is in the range of about 60° to 120° C.

24. The method of claim 23 wherein said temperature range is about 80° to 110° C.

* * * * *